Patented Apr. 27, 1954

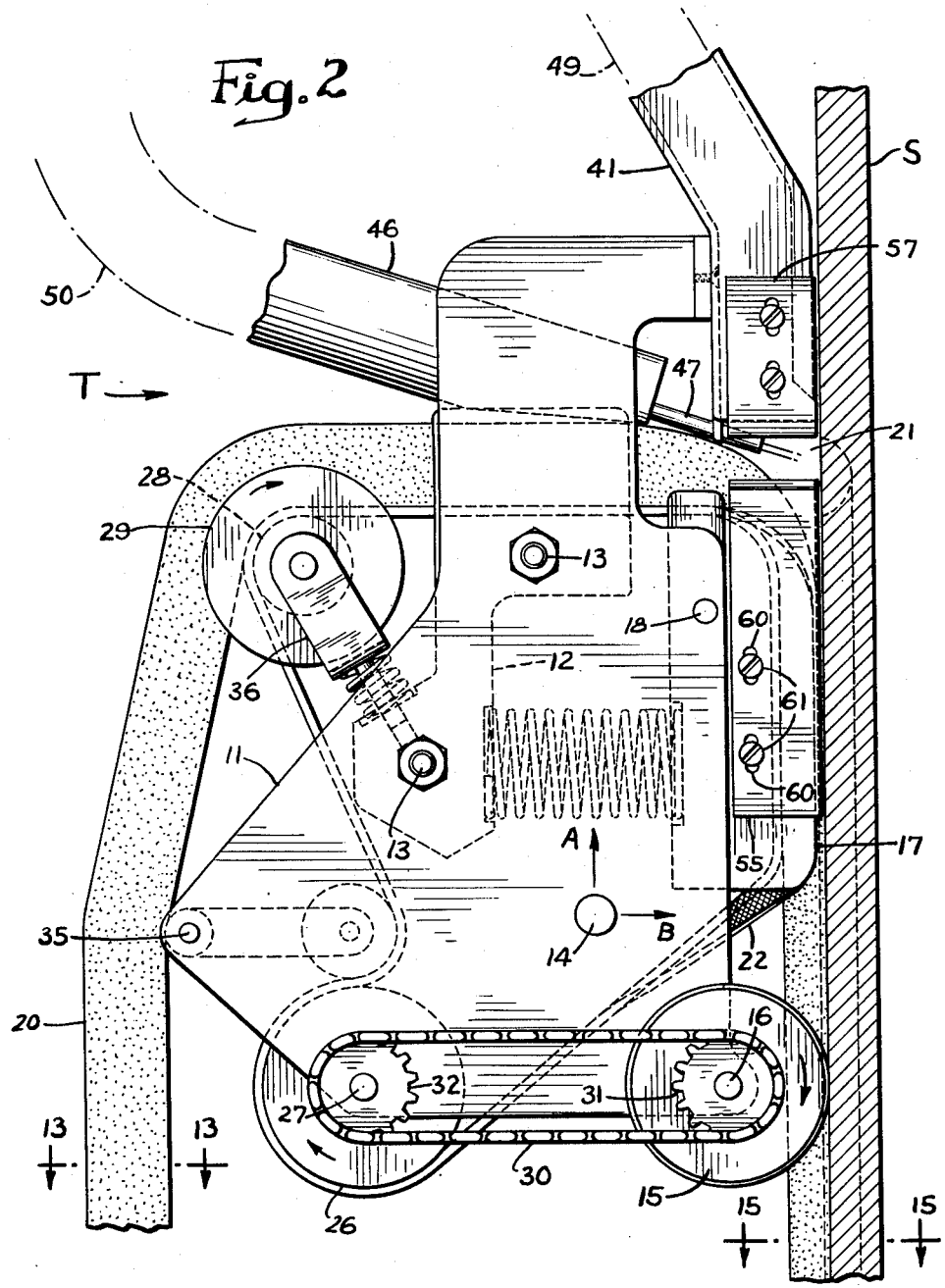

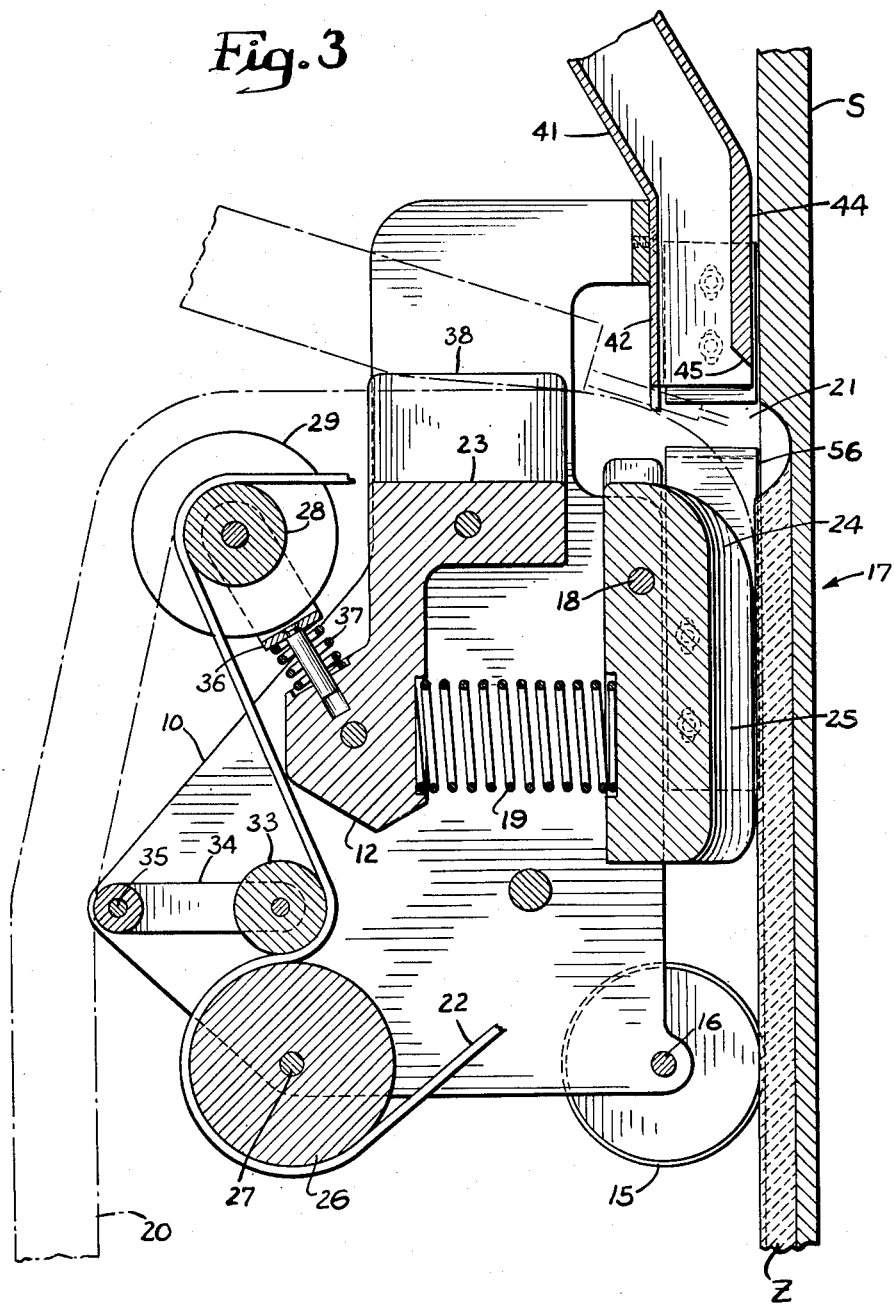

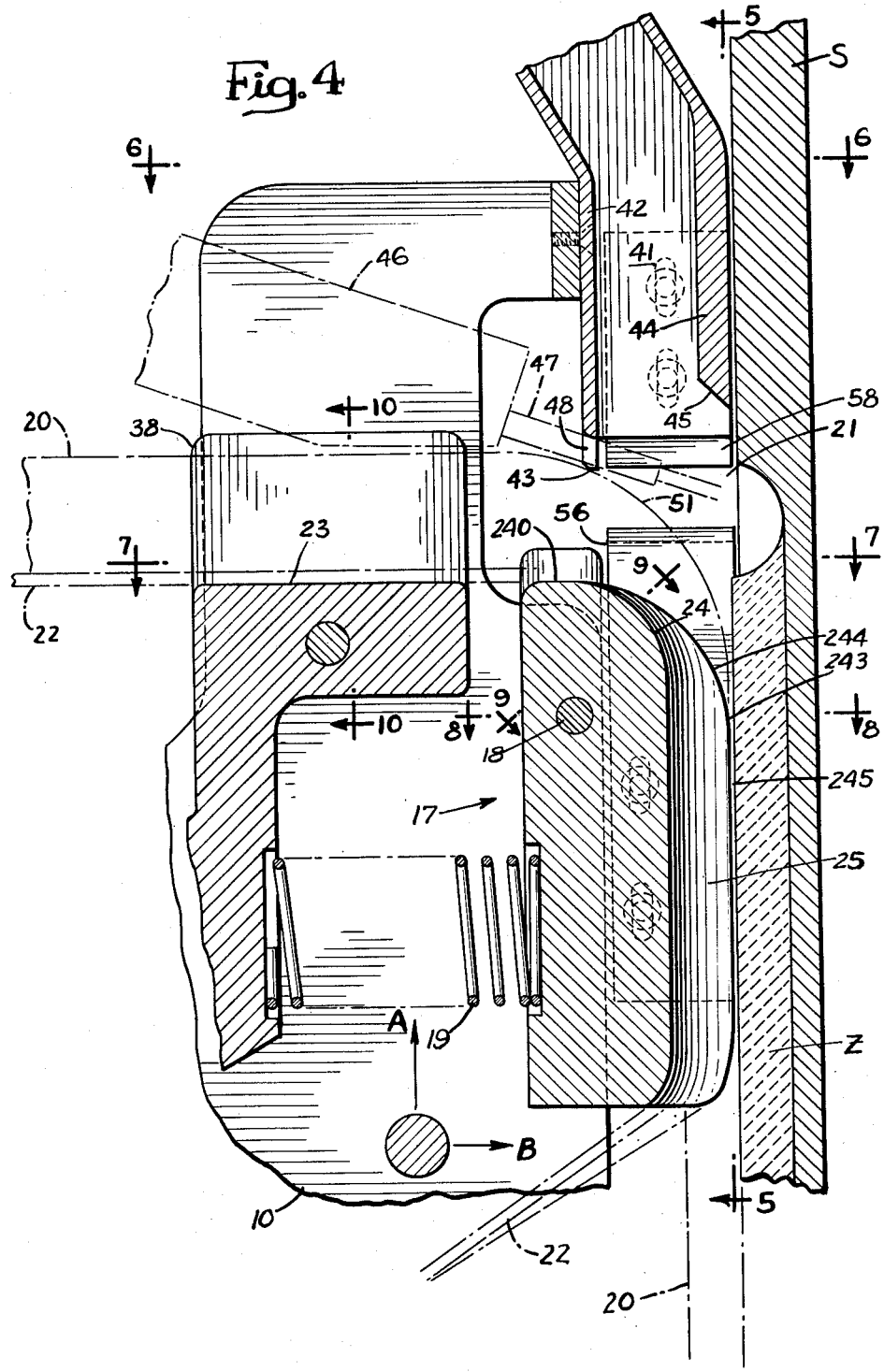

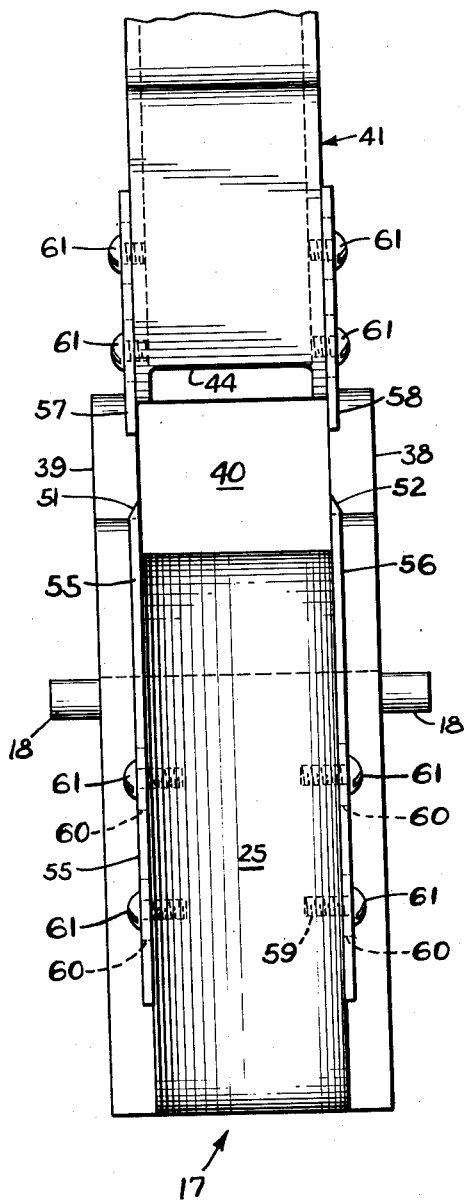
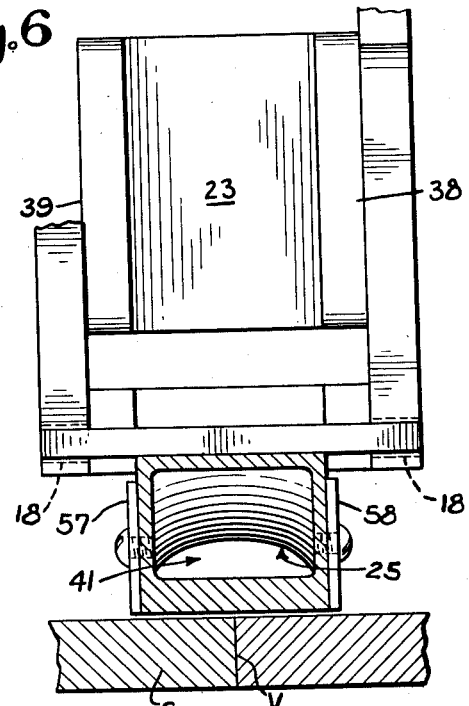
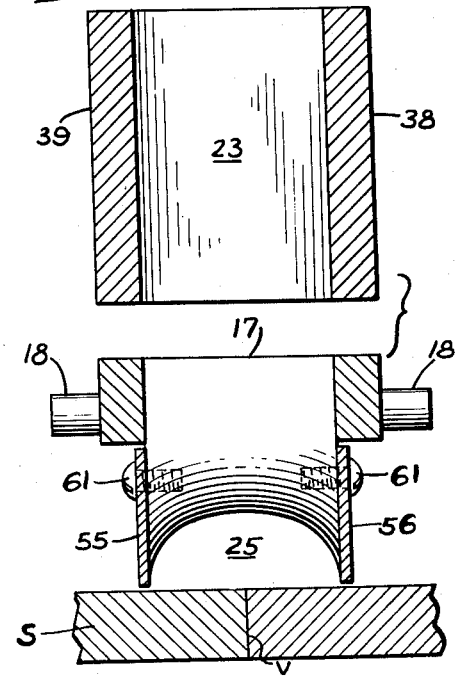

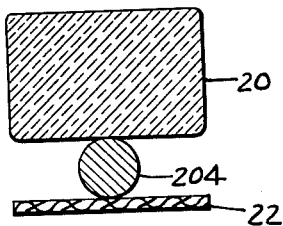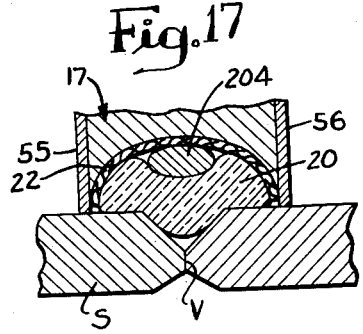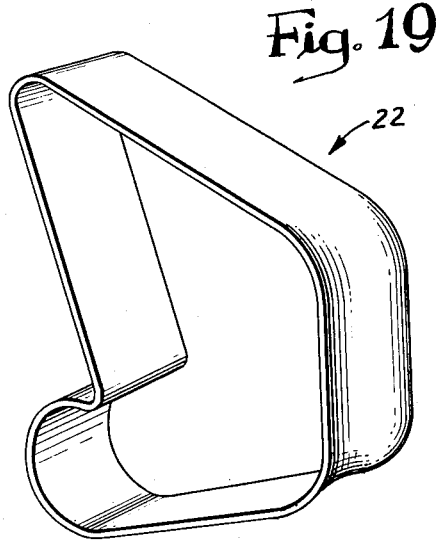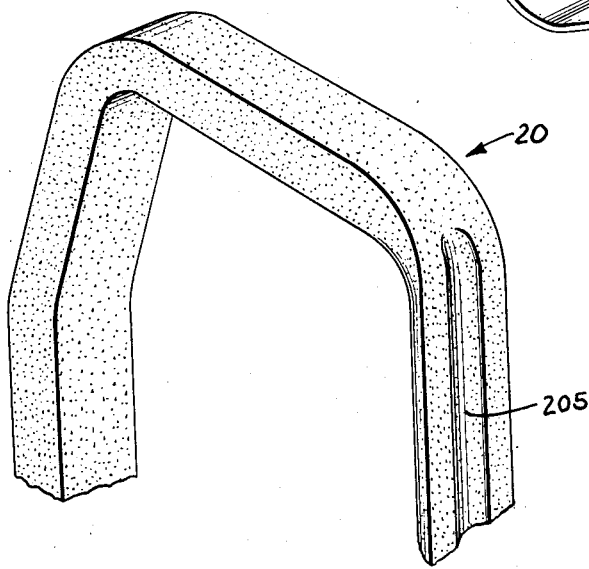

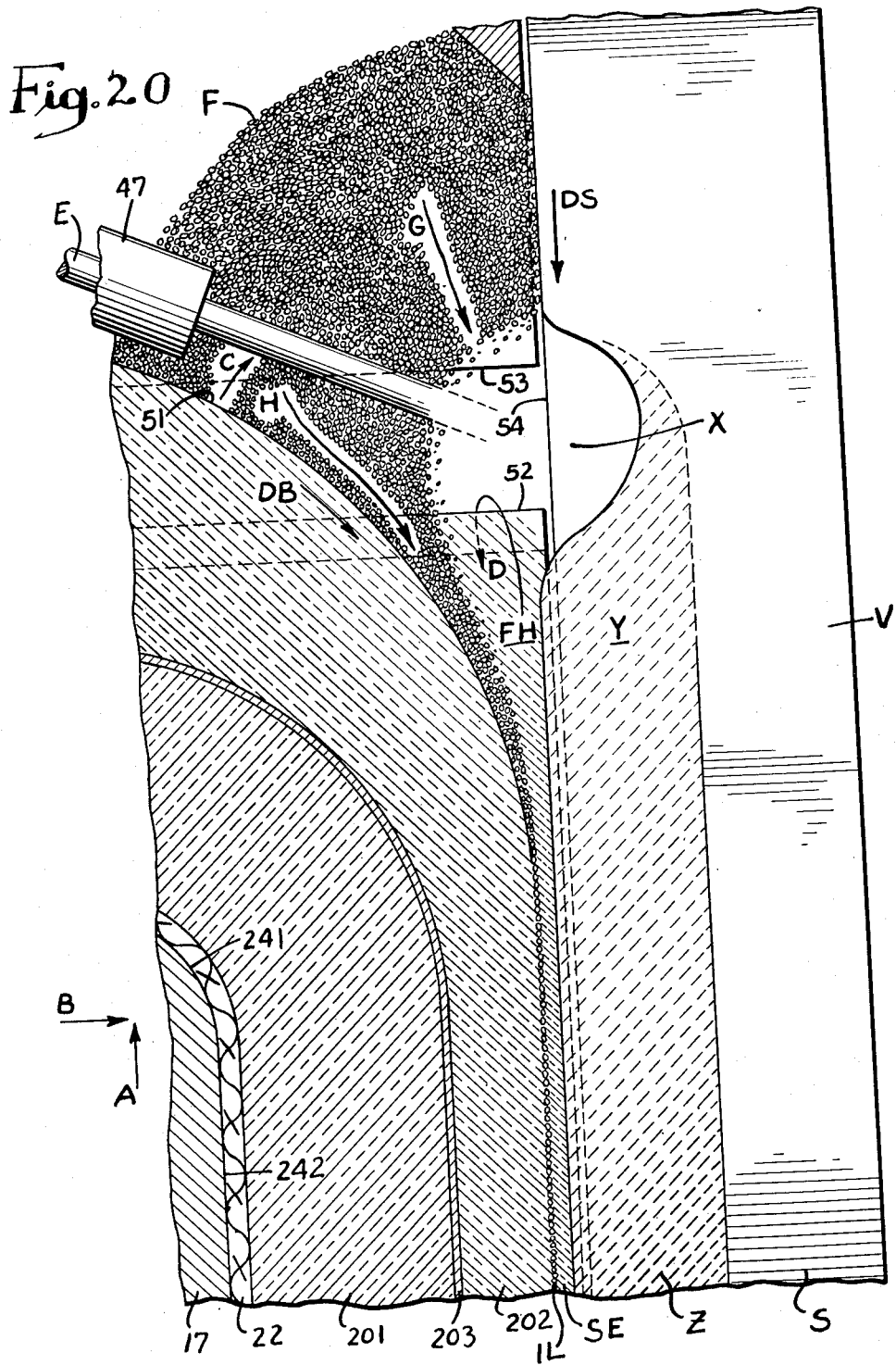

2,677,036

UNITED STATES PATENT OFFICE 2,677,036

ARC-WELDING PROCESS AND APPARATUS

Amel R. Meyer, Griffith, Ind., and Clarence Verbeek, Lansing, Ill., assignors to Graver Tank & Mfg. Co., Inc., East Chicago, Ind., a corporation of Delaware Application May 29, 1953, Serial No. 358,314

18 Claims. (Cl. 219—8)

This invention relates to submerged arc welding of elongated seams in work piece surfaces which are oriented in other than the flat downhand welding position. For instance the work piece surface may lie in a vertical plane, in an inclined plane or in a flat plane facing downward.

Such welding involves a serious difficulty which does not occur in the so called flat downhand position. The molten and liquid materials, also called flux and metal melt, tend to run down or drip down under the influence of gravity, from any work piece surfaces which are not flat and facing upwardly. For this reason, flat and upwardly facing work piece surfaces for flat downwardly facing work piece surfaces for flat downward welding are practically always utilized in shop welding practice. This however is impossible in the majority of the field welding operations and in certain special shop welding operations.

Attempts were made in the past to solve this problem. They fall broadly into two classes: attempts to eliminate or counteract the tendency toward gravitational downward flow, for instance by premature chilling of the weld (which is generally objectionable because of resulting defects such as slag and gas entrapment); and attempts to support the melt against its tendency toward downward flow, by dam or envelope devices traveling relative to the work piece. A melt enveloping method is disclosed in a patent application filed by the senior one of the present joint inventors on May 11, 1953, under Serial No. 354,119, now Patent No. 2,673,916.

The present invention is an improvement upon the melt envelope method of said earlier application. It provides simpler and more consistent deposition of a sound and properly proportioned seam, in other than the flat downhand position. It achieves this improvement by a method which we call a "compressed arc method."

According to this method the melt, formed by a concentrated, submerged arc, is compressed and squeezed to displace the bulk of the flux melt as an upward flow but to keep the metallic melt in place and to support it by the compressed, squeezed, upwardly flowing flux melt. To compress the melt we use the resiliently compressible, refractory belt arrangement of the earlier application, together with a novel flux melt passage or vent.

Certain combinations of carrier belts and guide or pressure shoes with said envelope belt and flux venting means have been found preferable. These and other details of the invention, as well as the results and advantages obtained thereby will become clearer upon the particular description of a preferred embodiment of apparatus and operation hereunder. Such a description follows with reference to the drawing appended hereto wherein:

Figures 1 and 2 are front and side views, respectively, of apparatus in accordance herewith.

Figure 3 is a side view of said apparatus in a section taken along lines 3—3 in Figure 1.

Figure 4 is an enlarged detail from Figure 3.

Figures 5 to 10 are views taken along the respective lines in Figure 4.

Figures 16 and 17 are further modifications of Figures 14 and 15 respectively.

Figure 18 is a perspective fragmentary view of the resiliently compressible refractory belt, also shown in Figures 2, 14 and 15.

Figure 19 is a view generally similar to Figure 18 but showing the endless carrier belt for the resiliently compressible envelope belt.

Figure 20 is a greatly enlarged detail from Figure 4.

Figure 1:
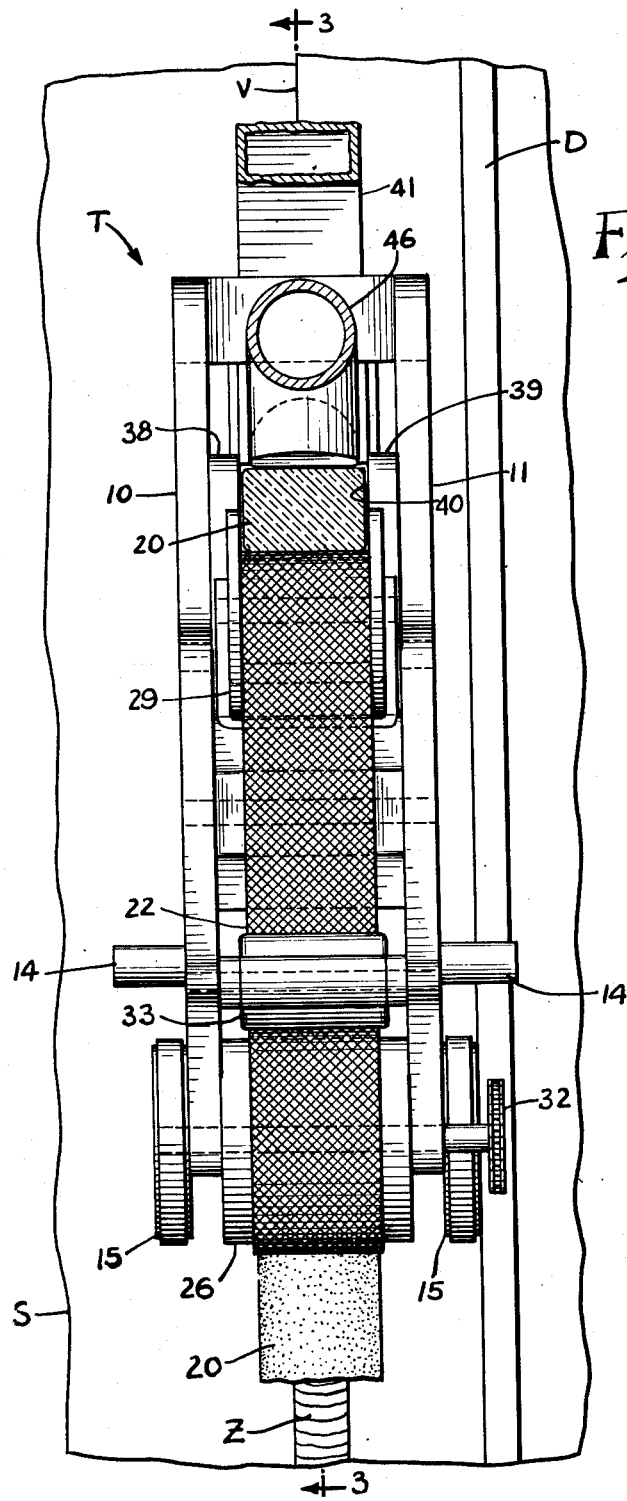
Figure 13:
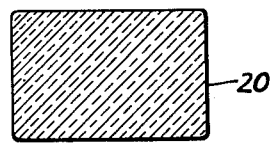
Figure 13 is a section taken along lines 13—13 in Figure 2.

The work piece surface is provided by a pair of shell plates S disposed in some position other than that which would permit flat downhand welding; as shown, in the vertical position. A vertical seam V is to be welded. For this purpose the new welding tool T is manually or automatically propelled along the seam V, using suitable guide rails D and other auxiliary devices, known to the art, if such be required; so as to insure the production of a straight and proper weld bead.

The tool T comprises a pair of flat vertical side plates 10 and 11, spaced from one another and interconnected by rigid block means shown at 12, which may be integral with a middle portion of the first plate 10 and attached to the other plate 11 as by screw means 13 or the like. The rigid frame formed by these parts 10, 11 and 12 has a pair of trunnions 14 laterally extending therefrom in a direction parallel or tangent to the shell plates S. The tool T can be manipulated by these trunnions, which can be engaged manually or by suitable mechanical equipment (not shown), so as to move the tool in a fixed direction (a vertical direction A as illustrated) while pressing it against the shell plates S (in a generally horizontal direction B as illustrated). The exact manner of applying pressure is important for the present invention, and basic details of this procedure will now be described.

When pressed against the shell plate in direction B, the tool T bears against the plates S in two superposed zones: (1) with a pair of rubber tired rollers 15 pivoted to the tool side plates 10 and 11 by a shaft 16 and disposed laterally outward thereof, on a line perpendicular to the weld seam V, and (2) along the face of a welding, guiding or pressure shoe device generally identified by the numeral 17, above the rollers 15. This shoe 17 is pivoted to and disposed between the side plates 10 and 11 by a horizontal shaft 18. Preferably the bottom portion of the shoe 17 is biased toward the shell plate S by some suitable force, such as that exerted by a spring 19 which may abut against the block 12. When so loaded the welding shoe is free to move in a manner to compensate for certain inevitable plate irregularities along the welding seam, while maintaining the required holding pressure on the underlying weld, through intermediary means to be described presently.

The shoe 17 serves to guide a resiliently compressible refractory belt 20 so that successive portions of the belt move into contact with the work piece surface at points located just below the welding arc. A basic function and purpose of such operation is that the well known flux submerged arc is adequately supported, the belt 20 being continuously applied as an envelope for the support of the melt produced by the arc. Additionally the belt 20 in the present method and apparatus serves to compress successive lower, outer parts of the weld melt so as to displace molten flux upwardly and laterally therefrom; the shoe 17 being so formed and equipped as to permit the displacement of such molten flux melt away from the welding zone through a flux vent arrangement 21. The metallic melt is not disturbed, and a thin, uniform envelope of fused flux is kept in position on the outside thereof, with another thin, interspersed film or layer of relatively cold, unfused flux interposed between the slag and the belt.

The interposed layer of cold flux has an important function as a heat insulator, so long as available materials for belt 20 are highly compressible but only moderately heat resistant. The belt must be protected from the intense heat of the welding zone. Details in this respect have been disclosed in said earlier application.

Figure 14:
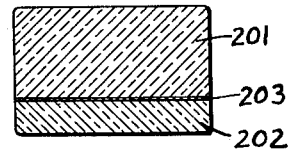
Figure 14 shows a slight modification of Figure 13.
Figure 15:
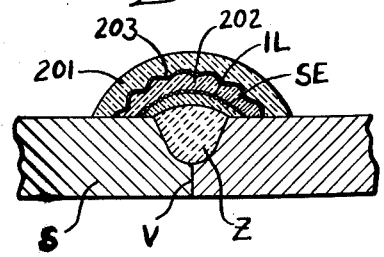
Figure 15 is a section taken along lines 15—15 in Figure 2.

For present purposes it is usually desirable to form the belt 20 from co-extensive glass wool layers 201 and 202, separated by and preferably bonded to a transverse layer of heat-reflecting aluminum foil 203, as shown in Figures 14 and 15. It may also be desirable, mainly when depositing a weld bead in a deep and narrow groove, to shape the belt 20 in approximate conformity with the desired insertion of the belt front into the groove. For this purpose, still another belt or rope 204 may be provided, along the belt 20 and spaced from the welding zone by the same, as shown in Figures 16 and 17. Such a rope 204 may be compressible, but less so than the main belt 20; and it will generally be narrower than said main belt. Of course the belts 20 and 204 can also be formed as a more or less integral strip, but frequently it is preferable to feed them to the welding zone as independent strips, of course keeping them symmetrically aligned with one another.

In order to perform its delicate, flux melt displacing but metal melt supporting functions, the resiliently compressible refractory belt 20 must be guided over the shoe 17 in a particular manner to be described hereinafter, and must also be kept in truly and accurately stationary position relative to the shell plates S to be welded together, while the tool T traverses upwardly. This requirement involves movement between the belt 20 and the shoe 17. For reasons to be stated, such movement is necessarily of a type involving sliding friction. On the other hand the resilient and compressible belt 20 must be made from loosely felted material which disintegrates readily. For these reasons the belt 20 is supported and guided by means of an endless carrier belt 22 passing over the shoe 17. Thus the present method, when utilizing the preferred belt arrangements, involves the provision of a considerable number of outwardly successive, mutually contacting zones, that is: the solid metal of the plates—the liquid metal of the welding zone—the liquid flux envelope—a solid flux envelope—a first compressible belt layer—a reflecting belt layer—a second and third compressible belt layer—a relatively strong carrier belt—and the solid metal or other material of the welding shoe.

The carrier belt 22 passes over a flat table portion 23 of the tool T, shown as being provided by the block 12. The belt then passes around a smoothly but somewhat abruptly rounded transition portion 24 of the shoe 17; then through a smooth, downwardly extending, forwardly concave channel portion 25 in the shoe 17; then over a cylindrical drive roller 26 held between the plates 10 and 11 by a horizontal shaft 27; then over a similar return roller 28; and then back to and over the table portion 23. The drive and return rollers 26 and 28 may have side flanges 29 to keep the belts properly aligned. The drive roller 26 is motorized or actuated at the proper speed, for instance by means of a chain 30 interconnecting sprockets 31 and 32 which are fast respectively on the shafts 16 and 27. In order to insure firm engagement between the drive roller 26 and the endless carrier belts 22, a cylindrical pressure roller 33 is provided between the flanges of the drive roller. The pressure roller is suitably supported by a link or fork structure 34, pivoted to the plates 10 and 11 at 35. In order to keep the carrier belt 22 taut, the return roller 28 may be mounted in a cradle or holder 36 which is biased outwardly relative to the carrier belt 22, as by a spring 37 which may abut against the outside of the block 12.

It will thus be seen that the outer surfaces of the carrier and envelope belts 22 and 20 can be kept substantially flat while the belts run over the table portion 23 and onto the transition portion 24 of the shoe, but that said outer belt surfaces are outwardly concave while the belts run through the channel portion 25 and in contact with the weld bead; these changes of configuration being clearly shown in Figures 18 and 19. Here the substantially flat, table-supported portion of each belt is shown at the top and the outwardly concave, channel-guided portion at the front. The outward concavity of the carrier belt 22 is caused and defined by the curved groove profile of the vertical groove 25 in the shoe 17, while the outward concavity of the envelope belt 20, shown at 205, is caused and defined by the shape of the weld bead deposited, which depends mainly upon details of heat input as explained in said earlier application.

Figure 8:
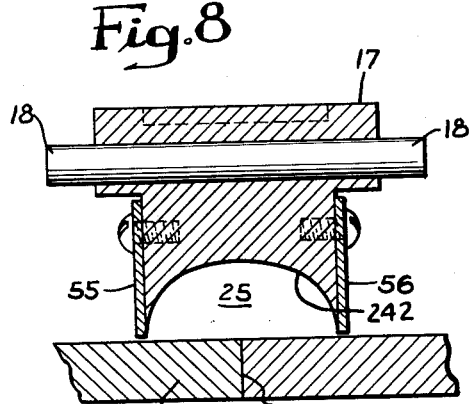
Figure 9:
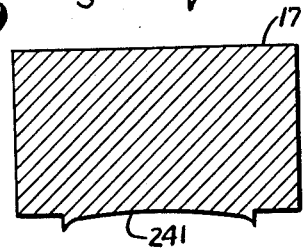
Figure 10:
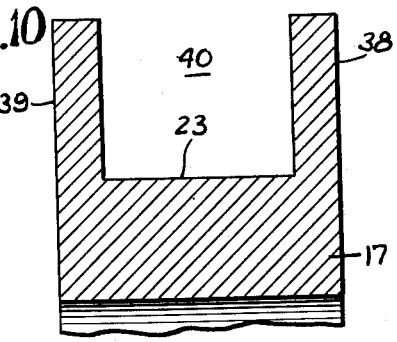

It is important for present purposes that the outward concavity or trough 205 in the compressible belt 20 should be formed at an elevation as close to the arc X as possible, regardless what the exact profile or curvature of the trough may be in horizontal section. Proximity between the arc and the zone of complete formation of the trough 205 in the belt 20 is desirable for proper melt compression, as will be explained more fully hereinafter. At this point it may be noted that the need for such proximity is the reason why the transition from the effectively uncompressed form to the effectively compresed form of the belt 20, in the transition portion 24, should be rapid and somewhat abrupt. A flat top surface 240 of this transition portion 24 should substantially intersect—except for some slight rounding off of the intersecting edge 241 for obvious mechanical reasons—with a forwardly concave, vertical front surface 242 of the same transition portion; the latter surface 242 merging into the vertical groove 25 as clearly shown in Figures 4, 8 and 9.

The side edges of the forwardly concave front surface 242 are substantially tangent to the shell S when viewed in a vertical plane normal to the shell surface; the point of tangency being reached in an area 243 slightly below the top of the table portion 23. Above this area 243 of tangent approach, said side edges may be suitably curved as shown at 244; below they are straight and substantially vertical as shown at 245. The pivot 18 for the shoe 17 is disposed at an elevation adjacent the area 243 of tangent approach, as best shown in Figure 4. In this manner adequate pressure is constantly maintained where it is most desired, while the lower front part 245 of the shoe can adapt itself to irregularities in the work piece surface S.

A pair of walls 38 and 39 are provided upon and rigid with the table portion 23 of the tool T, upstanding therefrom and defining a belt passage 40 between these walls; this passage being substantially as wide as the belt 20. A flux inlet fitting 41 in the form of a downwardly extending chute is secured to and held between the walls 38 and 39 above the shoe transition portion 24. The back wall 42 of this fitting has a lower edge 43, spaced above the top 241 of the transition portion 24, so as to allow passage of the belt 20 with slight friction, thereby preventing backward loss of flux. The front wall 44 of the flux fitting 41 preferably has a lower edge 45 spaced slightly above the lower edge 43 of the rear wall 42. This arrangement allows contact of a deep supply of flux F with the shell plates S, as is known to be desirable for good submerged arc welding.

The nozzle 46 for the electrode E has a front part 47 extending through a snug fitting opening 48 in the flux fitting back wall 42; suitable electric insulation being provided if the entire fitting 41 is made from electrically conductive material. It may be noted at this point that the flux fitting as well as the shoe can be made for instance from metal, molded carbon, ceramics or the like.

Suitable flux F for submerged arc welding, hereinafter sometimes called granular flux, is supplied from a suitable source (not shown) by a hose 49 to the flux inlet 41. Suitable electrode wire, preferably of small diameter as explained in said earlier application, is supplied to the nozzle 46 by a guide member 50, connecting with a conventional welding head (not shown).

For the removal of melt portions formed by the arc, the flux vents 21 are provided. They effectively form openings in the sides of the tool T, which sides are otherwise closed. Each vent as shown forms a four-sided window, one side of which is formed by the upper front surface 51 of the envelope and compressor belt 20. Said upper front surface, as mentioned, is somewhat abruptly curved, following the curvature of the transition edge 241 in the shoe 17. Thus each vent or window 21 has a very short, horizontal bottom edge 52, intersecting the upper front surface or transition portion 51 of the belt 20 slightly above the area 243 of tangent approach between the belt and the shell. Each vent has a somewhat longer, horizontal top edge 53, shown as spaced very slightly above the tip of the electrode E; in some cases this top edge may even be spaced below said tip. The fourth and last side 54 of the window opening or vent 21 is open to the front, except for the adjacent surface of the shell plates S.

In the embodiment as shown, portions of the side walls 38 and 39 are also cut off adjacent the vent area, in order to facilitate access to and inspection of the horizontal top portion of the belt 20 and other adjacent parts of the instrument.

The horizontal sides 52 and 53 of each vent opening 21 are shown as being vertically adjustable, by incorporating said sides in removable plate or gate members 55 and 56 at the bottom and 57, 58 at the top; one pair of gates such as 55, 57 being provided at each side of the tool. The top gates 57, 58 are shown as having square-edged lower ends, while the bottom gates 55, 56 preferably have sharp knife edges facing upward and contacting the belt 20 in the manner of small, lateral doctor blades. All four gates are individually secured to the tool T in a manner allowing vertical adjustment. For this purpose each side of the shoe 17 and flux chute 41 may have two screw holes 59 formed therein; and each gate 55 to 58 may have two vertically elongated slots 60, so that the gate can be attached to and removed from the tool, with suitable vertical adjustment, by screws 61.

*Operation*

In order to start operation, one end of the belt 20 is pulled through the horizontal channel 40 and vertical groove 25, over and above the carrier belt 22. The tool T is pressed to the shell in direction B and raised in direction A.

This causes rotation of the rubber tired rollers 15 and shaft 16, so that the sprocket and chain mechanism 30, 31, 32 rotates the shaft 27 and drive roller 26, which engages the carrier belt 22 with the help of the pressure roller 33, thereby keeping the vertical front of the carrier belt, in the vertical channel 25, temporarily stationary relative to the shell plates S. This results also in idling rotation of the return roller 28 and continuous, gradual pick-up of new portions of the resiliently compressible belt 20.

The latter belt accordingly moves horizontally over the table 23 toward the shell S, under the electrode nozzle 46, while electrode wire E and welding current are fed through that nozzle to the welding zone and a deep bed of flux F submerges the resulting arc X. This arc melts successive portions of the electrode tip and of the shell plates S, producing a column of liquid metal melt Y. The melt then gradually congeals to form the weld bead Z. The belt 20 supports the melt column Y substantially in the manner known from said earlier application.

The mound of flux F submerging the arc X has a front surface contacting the shell plates S, a bottom surface contacting the top 51 of the belt 20, and a pair of side surfaces which are largely supported by upper gates 57, 58 but unsupported in the areas of the vent openings 21. As a result of this latter condition some of the flux F tends to fall out through these openings. This amount however can be kept minor by suitable adjustment of the upper gates 57, 58.

As a result of the upward traversing of the shoe 17 along the plates S there is relative motion of the shell S downwardly along the front surface of the flux F in the direction DS, and relative motion of the belt 20 forwardly along the bottom surface of the flux F in the direction DB; both motions being coupled with sliding friction between the flux F and the contacting solid surfaces. These relative, frictional motions, in the absence of other forces, would tend to crowd the flux F into a small flux zone FH between the transition portion 51 of the belt 20 and the shell plates S.

However, the arc X continuously melts portions of the flux F as well as portions of the electrode E and shell plate S. Part of the molten flux mingles with the molten metal and is then ejected therefrom in known manner. Other parts of the molten flux remain separate. All or most of the molten flux is ultimately accumulated into a coherent fluid mass, the total volume of which is considerably less than that of the original granular flux; the gaseous constituents, if any, being allowed to escape through the granular mass above. Thus an appreciable shrinkage reduces the volume of the flux mound, reaching the arc zone X. This shrinkage causes a downward flux flow G into said arc zone.

Substantially the entire weight of the flux moving into the arc X as a flow G reappears below the arc, as material for the well known slag envelope SE of the weld zone Y. It reappears here in a volumetrically much reduced condition; therefore granular flux follows also as a flow H, around the arc X. Simultaneously, the inclined top surface 51 of the belt 20 moves upward and effectively forward, in directions C, thereby continuously tending to restrict the lowermost part of the zone FH and to compress it toward the plates S. Since the material in the zone FH, due to the above described influence of the arc X, is largely in the nature of liquid, fluid slag material SE, the pressure of the belt 20 tends to displace this slag toward available zones of lesser pressure; that is, upwardly and laterally. Here the provision of the vents 21 becomes important.

Zones of low pressure are created by these vents 21; and the aforementioned bottom pressure of the belt 20 results in upward and lateral flows D of liquid flux melt, counter-currently to the downward replacement flows G, H of flux and actually rising relative to the belt 20 and shoe 17. While the various flows are diagrammatically shown by slender arrows, they actually consist in relatively broad streams, which mix and mingle with one another and maintain a turnover or circulation of the flux melt in the arc chamber or flux zone FH.

The resulting appearance of the traveling shoe 17 and vent 21, in proper operation, is that of a "cinder notch" or slag vent in a miniature furnace, outwardly discharging a glowing mixture. The mixture consists mainly of liquid flux melt, with a small amount of solid, fused or unfused flux therein. No weld metal is displaced; this relatively heavy material, formed and disposed a slight distance from the belt 20, is merely supported against downward flow, by the forwardly squeezed, upwardly flowing flux melt.

In order to form a proper, smooth and sound weld bead Z it is further necessary to keep in mind the cooling effect applied to the welding zone by the granular flux F entering into the slag envelope SE, as explained in said earlier application. In fact this cooling effect is particularly pronounced in the present method, because as soon as the hot flux melt has been formed, it is bodily removed from, not only shifted within, the flux zone FH, resulting in positive, continuous replacement flows G, H of cold flux into the arc X and underlying zone FH. This cooling effect is a distinct aid for the use of the belt 20 but must be counteracted on the metal side of the zone FH in order to prevent slag and gas entrapment. Welding heat is therefore provided in a particular, concentrated manner, that is, with a much thinner electrode and much higher current density and preferably a somewhat slower traversing speed than is normal (the normal routines, in these respects, being those generally used in the well known submerged arc welding process in flat downhand position).

The overall result of the new operation as described is the formation of a smooth, sound weld bead Z with a thin but suitable, protective slag envelope SE and with a thin layer IL of granular flux, interspersed with the exposed part of the slag. Even a thin slag envelope SE shields the hot congealing metal from the ambient atmosphere. The flux layer IL shields the sensitive belt 20 from the hot welding zone. The yieldable compressible belt 20 compresses, squeezes and supports the outwardly successive layers Y, SE and IL, while displacing the excess flux melt and thereby removing a source of irregularity in the weld bead.

Because of the constant, gradual application of the resilient belt pressure, no undue deformation of the liquid metal Y takes place in normal operation. However, caution is required in this respect, mainly since the complete freezing of the metal is likely to occur only at an elevation below that where the slag SE has frozen. Along the entire length of the welding zone it is necessary to avoid excessive or irregular compression and resulting, undesirable flow, entrainment and possible discharge of molten metal portions. For example: when changing from one welding routine to another (as is frequently necessary, for instance when changing from the use of an electrode diameter of $\frac{3}{32}''$ to one of $\frac{1}{8}''$) this results in a modified arrangement of the metallic melt Y, relative to the belt 20; and in order to compensate for such new arrangement, the resilient compression applied by the belt may have to be readjusted. (For instance in the case mentioned it may be highly desirable to change from a type 315 Aircore belt, as described in said earlier application, to a type 316 belt.)

Likewise the flux melt and flux accumulation allowed or enforced, in the flux zone FH, may have to be readjusted. For instance, when depositing a bead near the root of a deep weld groove, where melt flows are restricted by closely adjacent surfaces of base metal, it is desirable to keep the knife edges 52 of the bottom gates 55, 56 relatively low. When depositing a bead nearer the work piece surface, under the same conditions in other respects, it is desirable to raise these knife edges. The range of required vertical adjustments is small; for instance it may reach only from near the 1 o'clock to near the 2 o'clock position on the curved belt portion 51; however, the effects are very distinct.

The conditions described, prevailing within the arc chamber, are illustrated in Figure 20 in diagrammatic manner, and with the understanding that a number of details are necessarily hypothetical, since the conditions actually prevailing in this chamber are invisible. For this reason we do not wish to be bound by the merely theoretical parts of the explanation and illustration furnished herein, which are presented only as an aid for better understanding of the apparatus and physical procedure as described.

As indicated in said earlier application, there is a definite advantage in the interception of a thin flux layer IL and thin slag envelope SE, because any increased thickness of such layers unavoidably causes increased variations of holding power therein and consequent irregularity of the weld bead Z. This will be understood more fully upon a mechanical analysis of the metallic melt Y. This melt in substance forms a column of liquid of downwardly decreasing mobility or fluidity; which column may have considerable height. It is firmly supported at the bottom by the congealed bead Z and in front by the base metal of the plate S, while being supported on the exposed side only by the compressible belt 20 and interposed layers IL, SE. In the arrangement of these latter materials, reasonable uniformity must be maintained as to depth, mass, specific weight, viscosity, direction of flow and other factors, if upper parts of the metallic melt column Y shall not occasionally sag into more or less yieldable, fluid contents of the zone FH, which would result in the formation of an irregular and objectionable bead Z. The melt column Y is more or less fluid, at any one location, for a number of seconds; and some local sagging would start in the absence of uniform supporting means and procedures, that is, in the absence of the upwardly-outwardly compressed melt displacement flow D, suitably adjusted by selection of a proper belt 20 and gate adjustment 52.

A practical advantage resides also in the fact that the gates 55 and 58 are removable and replaceable. There is a tendency in certain phases of the operation to intercept freezing or frozen slag on the solid surfaces over which this material flows. Whenever this happens the condition can be remedied by removing, cleaning and reattaching the gates.

Figure 11:
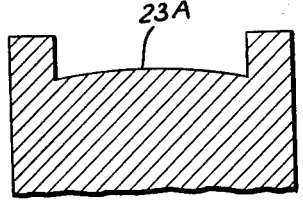
Figure 11 shows a slight modification of Figure 10.
Figure 12:
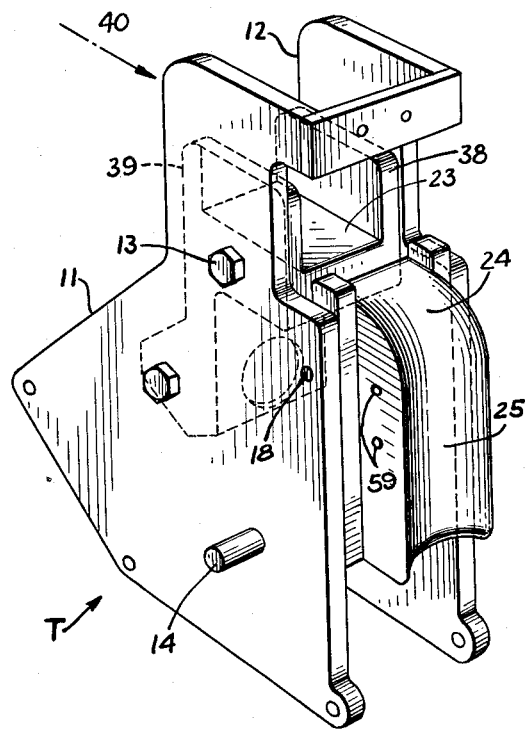
Figure 12 is a perspective view of the device of Figures 4 to 10.

The outward disposal of the flux and melt mixture may sometimes be further facilitated if the top surface 51 of the belt 20, in the transition zone 24, slopes outward rather than inward. The configuration of the channel 25, wherein the belts 20 and 22 are shaped to show outward concavity, counteracts this arrangement. Therefore it may be desirable to form the table portion 23 and/or the upper part 240 of the transition portion 24 with outward-downward slope, as shown at 23A in Figure 11.

The operation as described can be performed from one side of the shell plate S, or from both sides simultaneously. In the latter event the two shoes 17 traversing the opposite sides of the plate may be disposed directly opposite one another or substantially so, whereby more or less unitary metal melt zones Y are formed in accordance with the patent of Peters 2,529,812. However a shoe 17 on one side may also be more or less in leading position ahead of a shoe 17 on the other side. Differences in this respect are matters of degree and welding routine and are best determined by actual test.

Likewise, the routine can be changed in many other respects. For instance different types of filler wires or metallic electrodes or even carbon electrodes can be used. Horizontal seams in vertical plates or overhead flat seams in horizontal plates can be welded, with no substantial alteration of the method and equipment disclosed. Many other changes can be applied.

We claim:

1. In a welding process for use on a work piece surface oriented in other than the flat downhand position, the steps of traversing a welding area on the surface with a flux-submerged arc; compressing a portion of the melt formed by the arc to displace molten flux therefrom while keeping the molten metal substantially undisturbed; and removing the displaced molten flux from the welding area.

2. In a welding process for use on a laterally facing work piece surface, the steps of upwardly traversing the surface with a flux-submerged arc; compressing upwardly successive portions of the melt column formed by the arc and thereby upwardly and laterally displacing molten flux from said melt column, while substantially keeping the molten metal in position in said melt column.

3. In a process for welding an elongated seam in a laterally facing work piece surface, the steps of traversing the seam with a flux-submerged arc; compressing successive portions of the melt formed by the arc so as to support the molten metal against downward, gravitational escape, and to upwardly displace molten flux along the molten metal; and removing the displaced molten flux from the seam.

4. A welding process as described in claim 3 wherein an elongated, flexible strip is used for said compressing operation, the strip being progressively unrolled against the seam during said traversing operation.

5. A welding process as described in claim 4 wherein the flexible strip is yieldably compressible and partly compressed against the melt.

6. In a process for welding an elongated seam in a work piece surface oriented in other than the flat downhand position, the steps of traversing the seam with a concentrated arc submerged in a flux bed; and pressing successive portions of a highly compressible, at least moderately heat-resistant strip against the melt formed by the arc, so as to support the molten metal, displace molten flux from such melt, and replace such flux by cold flux from the flux bed.

7. A process as described in claim 6 wherein the strip is resiliently compressible and is partly compressed while pressing it against the molten metal.

8. A process as described in claim 7 wherein the resiliently compressible strip has a highly compressible layer in contact with the melt and a less compressible, front contour shaping layer remote from the melt.

9. Welding apparatus for use on a work piece surface oriented in other than the flat downhand position, comprising means for traversing the surface with a flux submerged arc to form a body of melt of molten flux and metal; and welding shoe means to compress successive portions of the melt so as to squeeze molten flux away from said body, along the molten metal, the welding shoes means comprising a housing for said arc and body; said housing having an opening to discharge the molten flux squeezed away from said body.

10. Apparatus as described in claim 9, comprising a vertically adjustable gate, forming part of said opening.

11. Apparatus as described in claim 10 wherein the gate has a sharp knife edge, forming a lower side of said opening.

12. Apparatus as described in claim 9 wherein the welding shoe means is a rigid member extending along the work piece surface in the traversing direction and which comprises a compressible belt, interposed between the shoe means and the work piece surface.

13. Apparatus as described in claim 12 wherein the rigid shoe means has a groove adapted to face and edgewise to contact the work piece surface and to guide the belt.

14. Apparatus as described in claim 13 wherein the belt is compressible and the forward end of the rigid shoe means, in the direction of traverse, has a transition portion smoothly but abruptly curved in a direction away from the work piece surface.

15. Apparatus as described in claim 12 wherein the rigid shoe means is supported for pivotal motion about an axis extending along the work piece surface and across the direction of traverse.

16. Apparatus as described in claim 15 wherein the rigid shoe means is biased toward the work piece surface in its entirety and the portion of the shoe means trailing in the direction of traverse is additionally biased toward the work piece surface.

17. Submerged arc welding apparatus for use on a laterally facing work piece surface, comprising a welding shoe adapted to traverse the surface upwardly with a submerged arc, forming a column of melt; a compressible belt having successive portions adapted to be interposed between the shoe and the surface in order to apply lateral pressure to the column of melt; and a carrier belt adapted to hold a portion of the compressible belt in temporarily stationary contact with the surface and the column of melt, while the shoe traverses along the same.

18. Apparatus as described in claim 17 wherein the carrier belt is endless; the apparatus comprising means to move the carrier belt relative to the shoe at a speed equal to the traversing speed of the shoe.

References Cited in the file of this patent
UNITED STATES PATENTS

| Number | Name | Date |
|---|---|---|
| 2,294,439 | Bagley | Sept. 1, 1942 |
| 2,331,937 | Schreiner | Oct. 19, 1943 |
| 2,362,505 | Smith | Nov. 14, 1944 |
| 2,395,723 | Chmielewski | Feb. 26, 1946 |